United States Patent
Levenshteyn et al.

(10) Patent No.: US 9,124,593 B2
(45) Date of Patent: Sep. 1, 2015

(54) MANAGING AN EXECUTION OF A COMPOSITE SERVICE

(75) Inventors: Roman Levenshteyn, Aachen (DE); Konstantinos Vandikas, Solna (SE); Eugen Freiter, Berlin (DE); Ioannis Fikouras, Stockholm (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 359 days.

(21) Appl. No.: 13/519,925

(22) PCT Filed: Dec. 31, 2009

(86) PCT No.: PCT/EP2009/009345
§ 371 (c)(1),
(2), (4) Date: Sep. 6, 2012

(87) PCT Pub. No.: WO2011/079854
PCT Pub. Date: Jul. 7, 2011

(65) Prior Publication Data
US 2013/0013781 A1  Jan. 10, 2013

(51) Int. Cl.
G06F 15/173 (2006.01)
H04L 29/08 (2006.01)
(Continued)

(52) U.S. Cl.
CPC .......... *H04L 67/1008* (2013.01); *H04L 67/101* (2013.01); *H04L 67/1023* (2013.01); *H04L 67/2838* (2013.01); *G06F 11/3006* (2013.01);
(Continued)

(58) Field of Classification Search
None
See application file for complete search history.

(56) References Cited

U.S. PATENT DOCUMENTS

2008/0320497 A1* 12/2008 Tarkoma et al. ............. 719/319
2010/0218202 A1   8/2010 Fikouras et al.
2010/0318658 A1* 12/2010 Zorn et al. ................... 709/226

FOREIGN PATENT DOCUMENTS

EP   1879358 A1   1/2008
EP   1978758 A1  10/2008
(Continued)

OTHER PUBLICATIONS

Niemöller, J. et al. "Aspect Orientation for Composite Services in the Telecommunication Domain." Service-Oriented Computing, Nov. 24, 2009, pp. 19-33, Springer Berlin Heidelberg, Berlin.
(Continued)

*Primary Examiner* — Chris Parry
*Assistant Examiner* — Caroline Jahnige
(74) *Attorney, Agent, or Firm* — Coats & Bennett, PLLC

(57) ABSTRACT

The present invention relates to a method for managing an execution of a composite service, the composite service comprising constituent services. The method comprises providing (101) first service complexity measures indicating a complexity related to executing a number of constituent services of the composite service by a first service execution node, providing (103) second service complexity measures indicating a complexity related to executing the number of constituent services of the composite service by a second service execution node, determining (105) a first total complexity measure upon the basis of the first service complexity measures, determining (107) a second total complexity measure upon the basis of second service complexity measures, and selecting (109) either the first service execution node or the second service execution node in dependency of at least one of: the first total complexity measure or the second total complexity measure for executing the number of constituent services of the composite service.

20 Claims, 8 Drawing Sheets

(51) Int. Cl.
*H04L 29/06* (2006.01)
*G06F 11/30* (2006.01)

(52) U.S. Cl.
CPC ......... *G06F 11/3051* (2013.01); *H04L 65/1016* (2013.01); *H04L 67/02* (2013.01); *H04L 67/16* (2013.01)

(56) References Cited

FOREIGN PATENT DOCUMENTS

| | | |
|---|---|---|
| EP | 2015510 A2 | 1/2009 |
| WO | 2008119364 A1 | 10/2008 |

OTHER PUBLICATIONS

3rd Generation Partnership Project; "Technical Specification Group Services and System Aspects; Study on Architecture Impacts of Service Brokering," Release 8, 3GPP TR 23.810, v. 8.0; Sep. 2009, pp. 1-26; 3GPP, Mobile Competence Centre, 650, route des Lucioles, 06921 Sophia-Antipolis Cedex, France.

3rd Generation Partnership Project; "Technical Specification Group Services and System Aspects; Network Architecture," Release 9, 3GPP TS 23.002, v. 9.2, Dec. 2009, pp. 1-92; 3GPP, Mobile Competence Centre, 650, route des Lucioles, 06921 Sophia-Antipolis Cedex, France.

* cited by examiner

MANAGING AN EXECUTION OF A COMPOSITE SERVICE

TECHNICAL FIELD

The present invention pertains to managing composite services in particular in a communication network.

BACKGROUND

One of the emerging communication technologies for delivering multimedia services across fixed and mobile access networks is the IP Multimedia Subsystem (IMS). The network architecture according to IMS comprises a service layer, control and connectivity layers, and an access layer. The control layer comprises call session control functions (CSCFs) forming central nodes for the provision of the SIP signaling (SIP: Session Initiation Protocol). The SIP protocol is one of the core technologies used by IMS for controlling the multimedia sessions combining voice and data streams.

A further core component of the IMS network architecture is the Service Capability Interaction Manager (SCIM) which was introduced in the 3GPP TS 23.002 standard as a function within a SIP Application Server domain of the IMS architecture. The role of the SCIM is that of a service broker in more complex service interaction scenarios which cannot be supported through the service filtering mechanism. The SCIM as proposed to the 3GPP uses an ISC interface to enable composite service behavior leveraging simpler service capabilities. In practical terms, a "capability" is a system component that may be used, presumably with other components, to implement a "service" that is packaged and delivered to end users of the network. For example, a group list server and a presence server may both be considered "capabilities" that are used to implement a sophisticated conferencing service. In this regard, an open issue in the 3GPP Release 9 specification is the orchestration of interaction between "capabilities" in the larger network which are represented as SIP Application Server instances.

SCIM can be implemented using service composition approach, where services, also called constituent services, may be aggregated to composite services. Composite services address complex user requirements that usually can not be covered by existing services. Hence, composite services offer added value in the form of new functionality compared to the sum of the functionality of their building blocks.

By way of example, some basic services and enablers may enable a weather forecasting service and a positioning data service. Both can be used individually, however combining them into a composite service that provides a location based weather forecast creates a new type of functionality with an added value. For this reason, composite services are often referred to as value added services. A location based service, in this example a location based weather forecast, may be created out of two existing components, namely an enabler that provides location information and a weather forecast service.

The exposure of these functions, such as SOA services (SOA: service oriented architecture), allows an application to individually discover them by querying a service repository and then individually bind these services. The process of discovering appropriate services as well as the far more complex logic for binding these services and making use of their functionality is implemented in the application itself. The developer of the application logic may consider and cover all eventualities at design time, e.g. faulty services, possibly a number of different technologies/formats, and a host of other issues that are not directly related to the actual end-user service, but rather to the usage of the enabling services.

The service composition functionality usually introduces an entity—the service composition engine—that takes care of this complexity for the application. In this scenario the application implements just its core logic, whereas the enabling functionality such as the "location-based weather forecast" is exposed by the composition engine as a single service that may be easily discovered and bound by the application. In the given example, the composition engine executes application logic in the form of the definition of the composite service "location-based weather forecast". This composite service describes the type of required services, so that the engine—in particular at run-time—may discover, bind and execute appropriate services. Composition functionality, consequently, allows for great flexibility e.g. in handling events such as a faulty enabler. In this case, the engine could bind an alternative service without any disruption of the end-user application.

A service composition may enable the decoupling of application logic and enabling further functions. By extracting parts of the logic from the application and implementing it in a formalized way with the help of a composition entity, i.e. engine, a number of advantages become possible. The application logic becomes easily reusable and adaptable, it also becomes easier to implement since it may make use of the event-driven facilities of the composition engine.

Decoupling of application logic and exposure of functionality as reusable services is clearly facilitated by component-based software development and modeling of the application functionality. On the one hand, software components or groups thereof already represent cleanly defined units of functionality i.e. good candidates for services. Consequently, understanding the application functionality based on its modeling is the basic requirement for defining aggregate application functionality in a composition.

Clearly, composition sessions may contain data. These data are usually manipulated by the process according to instruction in its composite service description, i.e. according to a wish of a composite service designer. The data is either directly manipulated by these instructions, e.g. assigning a value to a variable, or indirectly, e.g. as results of services invocations. Sometimes, this kind of composition session state data is also called "Shared State Data", because they represent the state shared between all services participating in a given composition session.

IMS was designed to deliver real-time, e.g. voice, and soft-real-time, e.g. SMS, services to customers. Accordingly, all nodes including SCIM should fulfill real-time or at least soft-real-time requirements, wherein, according to frequent customer requirements, a latency imposed by a SCIM node during an IMS call establishment may not exceed few dozens of milliseconds. However, with increased complexity of the composite services, the additional latency introduced by the SCIM may become a challenging issue. One of the main sources of additional latency is the invocation of constituent services. In this regard, latency is sum of time required by the constituent service to execute its internal logic and of the network latency between SCIM node and the constituent service. In networks with more then one SCIM node, the selection of the SCIM node for execution of composite service may also have an impact on a latency of a composite service.

Accordingly, there is a need for efficiently managing an execution of a composite service in a communication network in which service execution nodes, e.g. composition engines, are provided for executing constituent services of the composite service.

SUMMARY OF THE INVENTION

The invention is based on the finding that an execution of a composite service may efficiently be managed if at least some constituent services of the composite service are executed by a service execution node which is selected from a plurality of service execution nodes such that the complexity related to executing the constituent services by the selected service execution node, e.g. latency, is minimized.

As the service execution nodes may be arranged in a communication network, different latencies may be expected when executing the constituent services by different service execution nodes. By way of example, the service execution nodes may be formed by composition engines, wherein the composite service latency may be reduced when selecting the composition engine which has the smallest impact on the composite service latency. Further latency reduction may be achieved when changing the composition engine which is responsible for executing the composite service during the execution of the composite service. Thereby, the execution process may be moved from one composition engine to further reduce complexity. Generally, the optimization approach leading to the complexity reduction may be based upon optimizing any network related costs, i.e. complexity measures, related to executing composite services such as total bandwidth or energy consumption.

According to an aspect, the invention relates to a method for managing an execution of a composite service which may comprise constituent services. The method comprises providing first service complexity measures indicating a complexity related to executing a number of constituent services of the composite service by a first service execution node, providing second service complexity measures indicating a complexity related to executing the number of constituent services of the composite service by a second service execution node, determining a first total complexity measure upon the basis of the first service complexity measures, determining a second total complexity measure upon the basis of second service complexity measures, and selecting either the first service execution node or the second service execution node in dependency of at least one of: the first total complexity measure and/or the second total complexity measure for executing the number of constituent services of the composite service. Generally, the method may correspondingly be applied in a network with any number of service execution nodes.

By way of example, the first and second execution nodes may be formed by composition engines arranged in a communication network at e.g. different locations. Therefore, the complexity measures may relate to network complexity measures being determined by network characteristics such as bandwidth, transmission delays, available transmission slots or latencies. The decision which composition engine executed the composite service at the minimal network related costs can be made before or after the composite service execution has started.

According to an embodiment, the method comprises initiating the execution of the number of constituent services of the composition service by the selected service execution node. By way of example, in order to initiate the execution of the number of constituent services, an execution request may be transmitted towards the selected service execution node over a communication network. The execution request may be transmitted by another service execution node or by a control node such as a composition execution agent or another network entity.

According to an embodiment, session information relating to the execution of the composition service may be transmitted towards the selected service execution node. The session information may comprise a session workflow indicating how to execute the constituent services within the framework of the composite service. The session information may further comprise control information controlling the execution of the number of constituent services by the selected service execution node. The session information may be transmitted by a control entity which is in charge with controlling the execution of the composite session. However, the session information may be transmitted towards the selected service execution node by another service execution node which may be in charge with executing e.g. another part of the composite service in particular in a distributed computing network scenario.

According to an embodiment, the method may further comprise determining an initial complexity measure accumulated during previous executions of the composite service, and selecting either the first or the second service execution node in further dependency of the initial complexity measure. The initial complexity measure may e.g. reflect a complexity relating to executing e.g. another number of constituent services of the same composite service session prior to executing the number of the constituent services by the selected service execution node. However, the initial complexity measure may also relate to previous executions of the composite service during previous composite service sessions. In order to take the initial complexity measure into account, either the service complexity measures or the total complexity measures may be increased by the initial complexity measure. However, the initial complexity measure may be taken into account as an additional parameter when e.g. determining the total complexity measures upon a basis of a mathematical optimization approach such as the least squares algorithm.

According to an embodiment, the first service execution node is selected if the first total measure does not exceed or is smaller than the second total complexity measure. Correspondingly, the second service execution node may be selected if the second total complexity measure does not exceed or is smaller than the first total complexity measure. In order to determine which total complexity measure is the minimum one, the total complexity measures may be compared with each other or, respectively, with a complexity threshold. The comparison may be performed by means of a comparator comparing e.g. numbers representing the total complexity measures. Therefore, the service execution node which is associated with the total complexity measure below the complexity threshold may be selected.

According to an embodiment, the composite service may comprise a further number of constituent services, wherein the method may comprise providing third service complexity measures indicating a complexity related to executing the further number of constituent services by the first service execution node, providing fourth service complexity measures indicating a complexity related to executing the further number of constituent services of the composite service by the second service execution node, determining a third total complexity measure upon the basis of the third service complexity measures, determining a fourth total complexity measure upon the basis of the fourth service complexity measures, and, i.e. during run-time, selecting either the first service execution node or the second service execution node in dependency of at least one of: the first total complexity measure and/or the second total complexity measure and/or the third total complexity measure and/or the fourth total complexity measure for executing the further number of constituent services of the composite service. Thus, the service execution node which is to execute the further number of constituent services may be selected upon the basis of all available total complexity measures, so that in particular the complexity relating to executing the first number of constituent services may also be taken into account. However, the service execution node which is to execute the second number of constituent services may be selected upon the basis of only the third and fourth total complexity values, so that that only complexity which relates to executing the second number of constituent services is taken into account for service execution node selection.

According to an embodiment, the composite service may comprise a further number of constituent services, e.g. the further number of constituent services mentioned above. The method may comprise providing third service complexity measures indicating a complexity related to executing the further number of constituent services by the first service execution node, providing fourth service complexity measures indicating a complexity related to executing the further number of constituent services of the composite service by the second service execution node, determining a third total complexity measure upon the basis of the third service complexity measures, determining a fourth total complexity measure upon the basis of the fourth service complexity measures, determining a minimum composite complexity measure upon the basis of the total complexity measures, and selecting either the first service execution node or the second service execution node to execute the respective number of constituent services at the minimum composite complexity measure. Preferably, the minimum composite complexity measure is determined upon the basis of all available total complexity measures.

According to an embodiment, the method may further comprise evaluating composite service information to determine the number of constituent services which are to be executed when executing the composite service. The composite service information may indicate at least one of: a structure of the composite service, the constituent services and session information, e.g. a workflow, relating to the execution of the composition service. The composite service information may be formed by the service skeleton describing e.g. an application logic as disclosed in the documents WO 2008/119364 A1 and the EP 1 978 758 A1, both incorporated herein by reference.

According to an embodiment, the method may comprise evaluating composite service information, i.e. the composite service information mentioned above, to determine the first or the second service complexity measures in dependency on a conditional execution of at least one constituent service when executing the composite service. The conditional execution of constituent services may result from service execution branches with conditional elements which may depend on the run-time state or on the results of previously executed services. Therefore, taking the conditional execution into account enables a more precise determination of the service complexity measures as, additionally, the run-time behavior of the composite service may be taken into account.

According to an embodiment, the method may comprise determining the service complexity measures upon the basis of pre-stored service complexity measures related to a previous execution of the constituent services. The service complexity measures may be determined upon the basis of a case-based composite service estimation under the assumption that the selection of services and branches under similar service conditions results in the same composite service. The service complexity measures may be determined or recalculated upon the basis of a service list indicating constituent services along with service complexity measures.

According to an embodiment, the method may comprise determining the service complexity measures upon the basis of static information comprising at least one of: a composite service template and/or a service description and/or a service location, in particular in a communication network. The composite service template may be provided e.g. by the composite service information mentioned above and list either constituent services or requirements with respect to constituent services for executing the composite service. Correspondingly, the service description may be indicated by the above mentioned composite service information. The static information provides service complexity measures which may be constant at least within a certain time interval.

According to an embodiment, the method may comprise determining the service complexity measures upon the basis of dynamic information comprising at least one of: composite session data and/or statistical records about service execution and/or a network load and/or a latency between network or session nodes and/or a result of at least one previous execution of the composite session. Thus, the service complexity measures determined upon the basis of the dynamic information may vary over time.

According to an embodiment, the first and/or the second total complexity measures may be obtained by summing up the respective service complexity measures or evaluating a complexity function, in particular a linear or a non-linear complexity function, comprising the service complexity measures as function variables. In particular, the complexity function may enable a multivariate complexity optimization.

According to an embodiment, the composite service may be at least one of: Internet Protocol Multimedia Subsystem (IMS) composite service, an instance of a Business Process Execution Language (BPEL) process, or an instance of a Business Process Modeling Language (BPML) process, or an instance of an Enterprise Service Bus (ESB) composite service.

According to an embodiment, the first and/or the second service execution node may be one of the following: a composition execution agent being adopted to operate according to the IMS technology and/or a composite service engine being adopted to operate according to the IMS technology and/or a computing node in a distributed computing network, in particular in a cloud computing network or in an ESB environment.

According to an embodiment, the service complexity measures may comprise at least one of: latencies related to executing the respective constituent service by the respective service execution node and/or time delays related to a data transfer over a communication network between a service location and the respective service execution node and/or network resources such as bandwidth allocated to the respective service execution node for executing a respective constituent service or the number of constituent services. The service complexity measures may respectively comprise only one of the above mentioned parameters such as latency. However, the respective service complexity measure may comprise, e.g. in a cumulated fashion, several parameters, e.g. time delays and latencies.

According to some aspects, the invention further relates to a method for the selection of the composition engine node for the execution of a composite service in order to reduce the network related costs introduced by invocation of constituent services, which may be applied before the execution of a composite service has been started or during the execution of a composite service and moving the execution process to another composition engine node, if necessary.

According to a further aspect, the invention relates to a service execution management entity for managing an execution of a composite service comprising constituent services according the principle described herein. Preferably, the service execution management entity comprises a complexity provider for providing first service complexity measures indicating a complexity related to executing a number of constituent services of the composite service by a first service execution node, and for providing second service complexity measures indicating a complexity related to executing the number of constituent services of the composite service by a second service execution node. Further functionality of the complexity provider is directly determined by the method steps for providing the first and the second service complexity measures according to the principles described herein.

The service execution management entity may further comprise a complexity determiner for determining a first total complexity measure upon the basis of the first service complexity measures, and for determining a second total complexity measure upon the basis of second service complexity measures. Further functionality of the complexity determiner is directly derivable from the method steps of determining the first and second total complexity measure according to the principles described herein.

The service execution management entity may further comprise a service execution node selector for selecting either the first service execution node or the second service execution node in dependency of at least one of: the first total complexity measure and/or the second total complexity measure for executing the number of constituent services of the composite service. Further functionality of the service execution node selector is directly derivable from the method step of selecting either the first or the second execution node according to the principles described herein.

According to an embodiment, the service execution management entity may comprise a transmitter for transmitting session information, e.g. a workflow, relating to the execution of the composition service towards the selected service execution node for executing the composite service.

According to an embodiment, the transmitter may further be configured to transmit an execution request towards the selected service execution node to initiate the execution of the number of constituent services of the composition service by the selected service execution node.

Further functionality of the service execution management entity is directly derivable from the steps of the method for managing an execution of a composite service according to the principles described herein.

According to a further aspect, the invention relates to a computer program for performing the method for managing the execution of the composite service when the computer program is executed on a computer.

According to a further aspect, the invention relates to a programmably arranged network entity being configured to execute the above mentioned computer program to perform the method for managing the execution of the composite service. The programmably arranged network entity may comprise a memory and a processor for executing the computer program. The programmably arranged network entity may be a service execution node, in particular a service composition engine, or a computing node in a cloud computing scenario or in an ESB environment or a service execution agent or any other network entity being involved in executing the composite session.

BRIEF DESCRIPTION OF THE DRAWINGS

Further embodiments will be described with reference to the following figures, in which.

DETAILED DESCRIPTION

Before embodiments of the invention are described in detail, it is to be understood that this invention is not limited to the particular component parts of the devices described or steps of the methods described as such devices and methods may vary. It is also to be understood that the terminology used herein is for purposes of describing particular embodiments only, and is not intended to be limiting. It must be noted that, as used in the specification and the appended claims, the singular forms "a," "an" and "the" include singular and/or plural referents unless the context clearly dictates otherwise.

Figure 1:
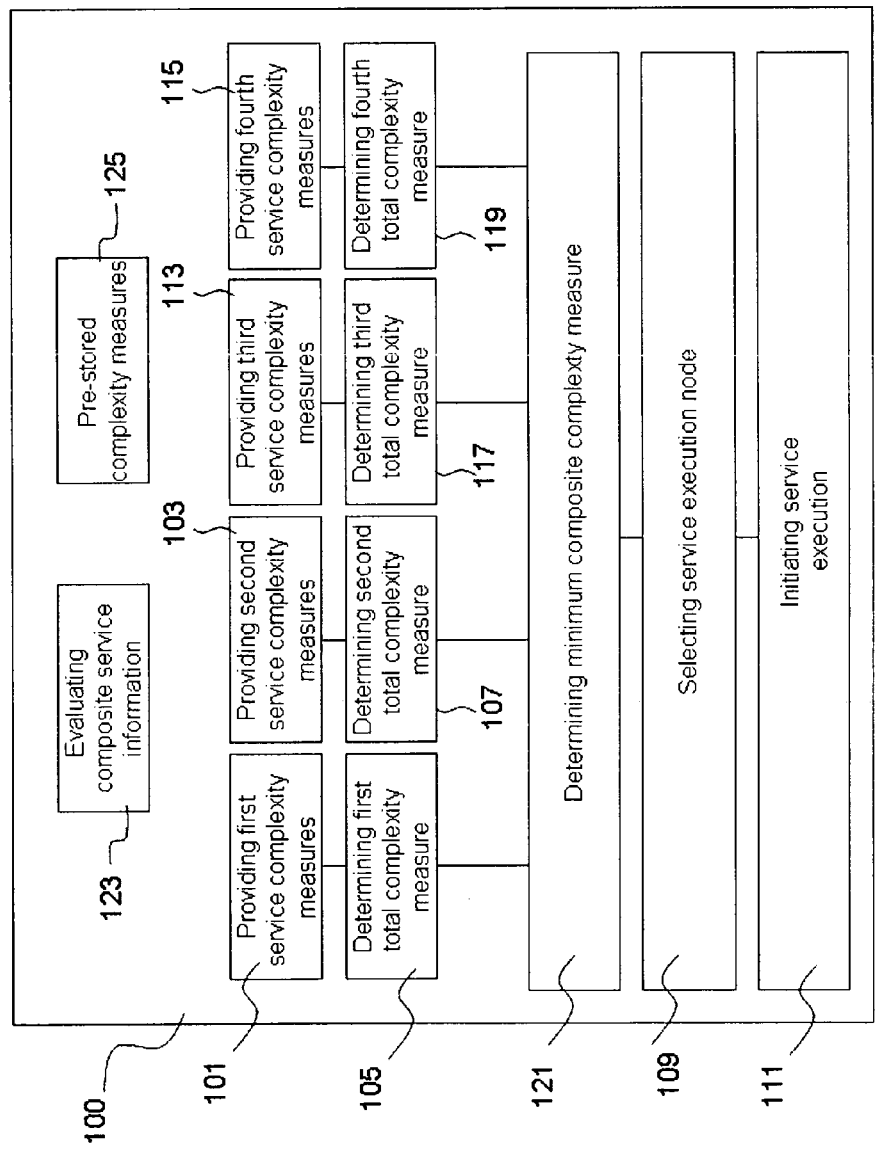
FIG. 1 shows a diagram of a method for managing an execution of a composite service according to an embodiment.

FIG. 1 shows a diagram of a method 100 for managing an execution of a composite service with constituent services according to some implementations. The method comprises providing 101 first service complexity measures indicating a complexity relating to executing a number of constituent services by a first service execution node which is not depicted in FIG. 1. Correspondingly, the method may comprise providing 103 second service complexity measures indicating a complexity related to executing the number of constituent services by a second service execution node which is not depicted in FIG. 1. The method further comprises determining 105 a first total complexity measure upon the basis of the first service complexity measures, and determining 107 a second total complexity measure upon the basis of second service complexity measures. The respective total complexity measure may be determined upon executing a complexity function which may be linear or non-linear using the service complexity measures as function variables.

The method may further comprise selecting 109 either the first service execution node or the second service execution node depending on the first and/or the second total complexity measure in order to execute the number of constituent services.

Optionally, the method may further comprise initiating 111 the execution of the number of constituent services by the selected service execution node. The step of initiating 111 the execution of the number of constituent services may further comprise transmitting an execution request towards the selected service execution node to execute the number of Constituent services, and/or transmitting session information, e.g. a workflow, relating to the execution of the composition service towards the selected service execution node.

According to some implementations, the composite service may comprise a further number of constituent services. Correspondingly, the method may comprise providing 113 third service complexity measures indicating a complexity related to executing the further number of constituent services, and providing 115 fourth service complexity measures indicating a complexity related to executing the further number of constituent services of the composite service. The method may further comprise determining 117 a third total complexity measure upon the basis of the third service complexity measures, and determining 119 a fourth total complexity measure upon the basis of fourth service complexity measures. The third total complexity measure and the fourth total complexity measure may be used in the step of selecting 109 either the first or the second execution node.

Optionally, the method may comprise determining 121 a minimum composite complexity measure upon the basis of the total complexity measures, wherein in the step of selecting 109 either the first or the second service execution node may be selected to execute the respective number of constituent services at the minimum composite complexity measure.

Prior to providing the number of constituent services, the method may comprise evaluating 123 composite service information, e.g. the service skeleton mentioned above, to determine the number of constituent services and/or to determine the first or the second complexity measures. Alternatively or in addition to the step of evaluating 123, the method may comprise determining 125 the service complexity measures upon the basis of either pre-stored service complexity measures related to previous executions of the constituent services and/or upon the basis of static and/or dynamic information.

For more complex composite services further improvement of network related costs can achieved by changing executing composition engine at later stage of composite service execution. In this case, a part, i.e. the number of constituent services, of the composite service is executed on one composition engine, and another part, i.e. a further number of the composite service on another composition engine, i.e. the execution process will moved to another composition engine. Further, the executing composition engine may also be replaced by another composition engine if for instance information based on the selection was made has changed, e.g. if a constituent service became unavailable or if network properties such as topology or bandwidth have changed.

Figure 2:
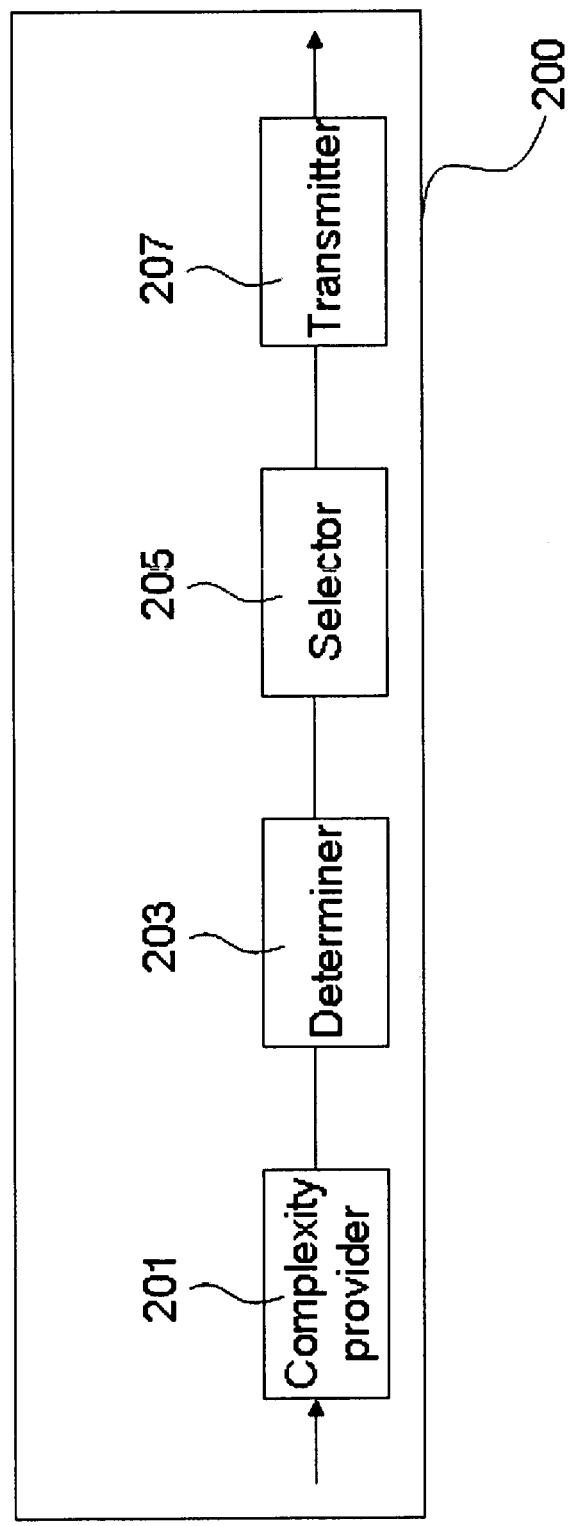
FIG. 2 shows a block diagram of a service execution management entity according to an embodiment.

FIG. 2 shows a block diagram of a service execution management entity 200 comprising a complexity provider 201 for providing service complexity measures, a complexity determiner 203 for determining total complexity measures based upon the service complexity measures provided by the complexity provider 201, and a service execution node selector 205 for selecting one of the available service execution nodes for executing the number of constituent services in dependency of the total complexity measures provided by the complexity determiner 203. Optionally, the service execution management entity 200 may comprise a transmitter 207 for transmitting composite service information, e.g. a workflow, relating to the execution of the composite service towards the selected service execution node over a communication network according to a communication technology which may be based on the IP communication technology. The transmitter 207 may further be configured to transmit an execution request towards the selected service execution node to trigger initiating the execution of the number of constituent services.

The service execution management entity 200 may form e.g. a composite service engine or any computing or network entity involved in executing the composite service. The elements 201 to 207 of the service execution management entity 200 may be arranged within the same communication entity such as e.g. a server. However, at least one or more of the elements 201 to 207 may be located at different locations of a communication network. Further, at least one of the elements 201 to 207 may form a stand-alone physical node or may be co-located with e.g. the selected service execution node such as a composition engine.

According to some implementations, the complexity provider 201, forming e.g. a cost provider, may collect information required for the calculation or determination of the network related complexity measures, e.g. costs, such as latency between composition engines and services. The cost information may be provided to other network nodes via an application protocol interface (API) which may be realized in the transmitter 207. Optionally, the results of the cost calculation may be cached and recalculated only in case of a change of involved variables. Thus, according to some implementations, the complexity provider 201 may comprise a network monitor observing the communication network and the services. Further, a subscriber notification approach may be implemented, e.g. in the transmitter 207, in order to notify other network nodes, e.g. other session execution nodes, about changes with respect to the complexity measures.

According to some implementations, the complexity determiner 203 and/or the service execution node selector 205 may perform an optimization analysis in order to select the best suitable service execution node, e.g. a composition engine node, to execute the composite service. Furthermore, the service execution node selector 205 may contact the respective service execution node in order to trigger the execution of the specific composite service on the contacted service execution node.

According to some implementations, the service execution nodes may form service composition engines. In this respect, a service composition engine is a service execution node that provides a complex service, i.e. a composite service, by identifying and executing a number of constituent software components, i.e. constituent services. Such a node may require information about the constituent components for its operation. This information may indicate the constituent services by way of e.g. service descriptions, description of the composite service using e.g. an application skeleton, session information, user profile information, or other system properties such as device capabilities and network status.

After a service has been selected, the composition engine may invoke it. In particular when the service is deployed not on the same network node as the composition engine, the network costs, i.e. complexity measures such as latency or bandwidth, between the composition engine and the service can make a significant part of the end-to-end service costs, e.g. end-to-end service latency. In cases of a distributed composition engine setup, e.g. where more than one composition engine is deployed in a network, the network related costs caused by service invocation can be reduced by selection of a composition engine node with the smallest total cost impact.

An algorithm embodying a composition engine may create a composite service by determining one constituent service after another while taking the information mentioned before into account. After the next constituent service is determined, it may be executed and results of the execution become a part of the session information and can be considered by the selection of the next constituent service. Other service composition approaches like BPEL or BPML may support mainly static service selection, i.e. services are selected at design time. The static service selection may be considered as a special case of the service selection at run-time, i.e. the service selection may not depend on any run-time information. Therefore, the dynamic service selection may be considered as a more generic case of the service selection.

Figure 3:
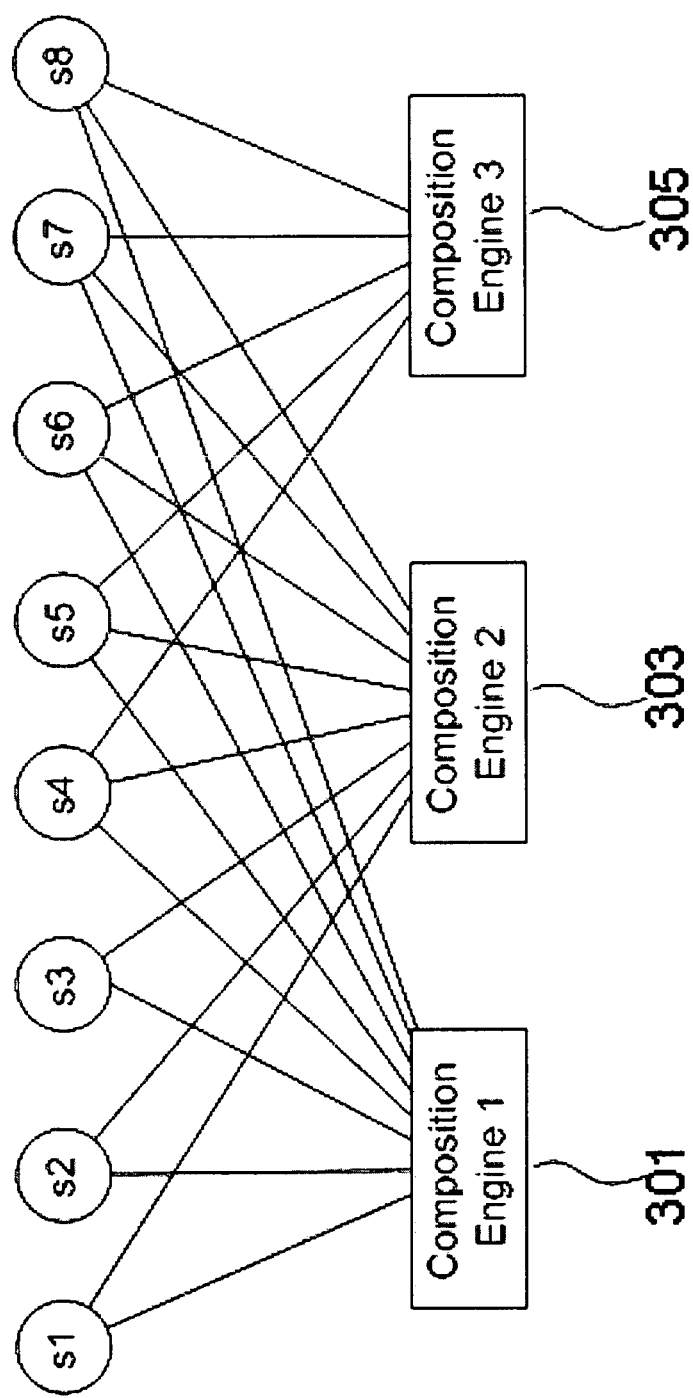
FIG. 3 shows a distributed composition engine setup according to an embodiment.

FIG. 3 shows an example of the distributed composition engine setup, with 3 composition engines 301, 303, 305, and 8 services s1, s2, ..., s8. By way of example, while the first composition engine 301 and the second composition engine 303 may invoke any of 8 services, the third composition engine 305 may invoke only a subset of the services, e.g. services s4, s5, ..., s8, which may be also considered by the selection of the composition engine. For each composition engine and service pair, a cost function or a complexity measure that express the network cost between the respective composition engine and the respective service, may be defined, e.g. as cost(ce,s). If, for instance, a composite service consists of 3 services, e.g. s1, s5, s8, then the total complexity measures, i.e. total network costs, to run it on the first composition engine 301 (composition engine 1) are:

cost(composition engine1,s1)+cost(composition engine1,s5)+cost(composition engine1,s8).

According to some implementations, in terms of network related complexity measures, an optimum composition engine in the network may be selected to run the composite service. In this regard, it may be distinguished between an initial selection of the best suitable composition engine and a change of the composition engine during the execution of the composite service so that a part, i.e. the number constituent services, of the composite service is executed on one composition engine and another part, i.e. another number of constituent services, is executed on another composition engine.

For an initial composition engine selection, the service composition approach as described in the documents the WO 2008/119364 A1 and the EP 1 978 758 A1 incorporated herein by reference creates composite services at run-time based an application skeletons and taking into consideration the run-time and network information. Hence, different composite services can be created based on the same application skeleton. Moreover, the service composition approach supports late-binding of constituent services. This means that the selection of constituent services takes place just before their execution. Which service is selected can also depend on results of the execution of other services, therefore elements of application skeletons are evaluated at run-time one after another. Consequently, it is not always possible to known in advance which services will be part of the composite service.

In order to estimate which services may be executed, the composition engine selector can pre-evaluate application skeletons as far as it is possible. Alternatively, a case-based approach may be applied according to which information gained from previous composite service executions can be reused to order to estimate the new execution.

Application skeletons as e.g. disclosed in the WO 2008/119364 A1 and in the EP 1 978 758 A1 may implement a composite service by defining the set of participating services, the structure of the composition, i.e. how individual services should be connected in order to form a composite service, and the control flow, i.e. in which order the individual services will be executed. In order to specify a service to be used as a component of composite services, the application skeleton may define a service template. This service template is a placeholder for a constituent service and describes the service to be used by means of abstract properties rather than by pointing to a concrete service deployment. Therefore, these properties constitute requirements on the service to be selected at run-time. They are therefore referred to as constraints of the service selection. For example, the following constraint (function='positioning') & (min_accuracy='0.1 km')

will select a service that provides the position of a mobile subscriber. It also specifies that only positioning services with a minimum accuracy of 100 m shall be considered.

According to some implementations, an application skeleton may go beyond a simple chain of service templates defining the set and order of constituent service invocations. In addition, conditional branches in the skeleton flow can be defined, resulting in alternative behavior of the composite service. The related branching conditions can for example evaluate the results of previously executed services.

Due to the abstract descriptions of the constituent services to be used within a service template, the application skeleton constitutes an abstract model of the composite service. Concrete services are selected according to the constraints at execution time rater than at design time. This characteristic is referred to as late-binding. The advantage of this approach is that a composite service can be designed without knowing the exact set of available constituent services. Furthermore, constituent services can be replaced by any compatible service without changing the composite service.

By way of example, an application skeleton forming an embodiment of the composite service information may comprise 4 elements: a start element, a service template, a conditional statement, and an end element. Service templates and conditional statement are particular interesting for the selection of the composition node, because they have a direct impact on the resulted list of services. Other service composition approaches may have corresponding elements in their languages, e.g. may invoke "and-if" elements in BPEL or "action and switch" elements in BPML. Hence, the approach disclosed herein may also be applied to other service composition approaches.

With regard to the service composition, skeletons may also be used to describe the application logic. Further examples for application logic description languages are Business Process Execution Language (BPEL) or Business Process Modeling Language (BPML). Such descriptions languages describe how to compose the application in a way similar to a program code that describes what should be done to achieve a certain result. An instance of a composition is typically created at run-time from such descriptions. In this sense, it is similar to how a new process is created by an operating system when it tries to execute the program that is saved on disk. Such an instance of the composition, a "process", is called composition session. Some other technologies, e.g. like BPEL and BPML, tend to call it BPEL process.

In order to estimate which constituent services will be a part of the composite service, the aforementioned pre-evaluation approach may be performed, according to which the composition engine selector may go through all elements of an application skeleton and may try to estimate what will be the result of the evaluation of these application skeleton's elements at run-time. The resulted list of services may be used to calculate the total costs to different composition engines. Finally the composition engine with minimal costs may be asked to execute the application skeleton by e.g. transmitting the execution request.

Further, in the static service composition according e.g. to the BPEL or BPML approaches, the results of pre-evaluation can be completely reused during the execution. In more dynamic approaches, the part of the results that not depend on run-time can be reused.

According to some implementations, also service templates, which are placeholders for a service, may be pre-evaluated. A service template contains an expression that describes which service should be executed. The composition engine evaluates this expression at run-time against the service repository and the run-time state. The results of the evaluation of a service template are one or more services, which may be considered as being equivalent so that any of these services can executed. In the next step, the composition engine may execute one of these equivalent services.

The pre-evaluation of the service templates means that expressions of all service templates of an application skeleton will be evaluated against the current service repository and the current run-time state. In contrast to the execution of the application skeleton, the services will not be executed during the pre-evaluation. Information about the service's costs to all composition nodes is used in order to select the composition node with the minimal costs impact. Further optimization dimension is to recommend a specific service out of equivalent services that would lead to the minimum network related costs. Later, at skeleton's execution phase, this recommendation may consider further selection criteria such as user/operators preferences, server load, etc.

Figure 4:
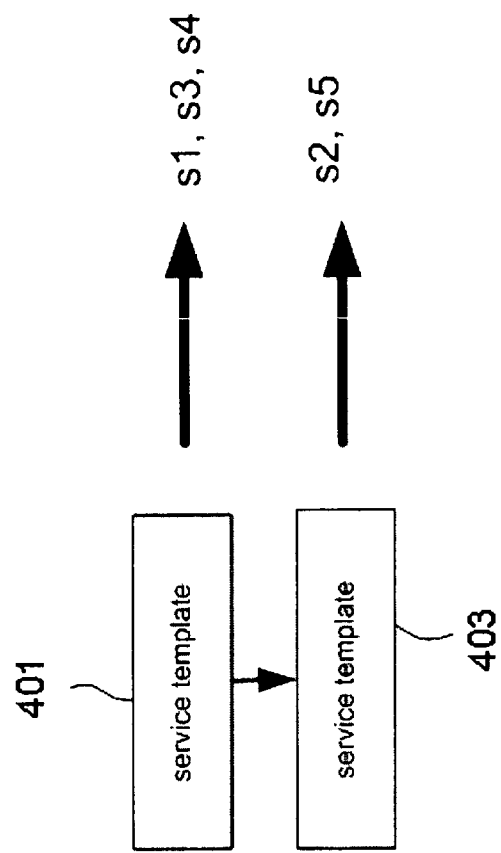
FIG. 4 shows service templates according to an embodiment.

FIG. 4 shows an application skeleton with e.g. only two service templates 401 and 404. By way of example, services S1, S3 and S4 match the first service template 401 and services S2 and S5 match the second service template 403. By way of example, the following table depicts service complexity measures, e.g. network costs such as latency in ms with respect to two different composition engines:

|  | Composition Engine 1 | Composition Engine 2 |
|---|---|---|
| Service S1 | 30 | 20 |
| Service S2 | 10 | 20 |
| Service S3 | 40 | 40 |
| Service S4 | 50 | 10 |
| Service S5 | 20 | 30 |

The optimal solution may be to select the service s4 for the first service template and the service s2 for the second service template and execute this application skeleton on the composition engine 2. This combination would add 30 of additional costs to the end-to-end service costs. Without this optimization it could be in the worst case 70 of additional costs (service s4 and s5 on composition engine 1, or s3 and s5 on composition engine 2). In order to find the minimum any mathematical algorithms for multivariable linear function optimization can be applied, e.g. the simplex algorithm.

According to some embodiments, also a pre-evaluation of branches may be performed. In this regard, conditional elements allow to define parts of application skeletons comprising branches that may depend on certain conditions, e.g. on a run-time state or on a result of a service invocation.

Figure 5:
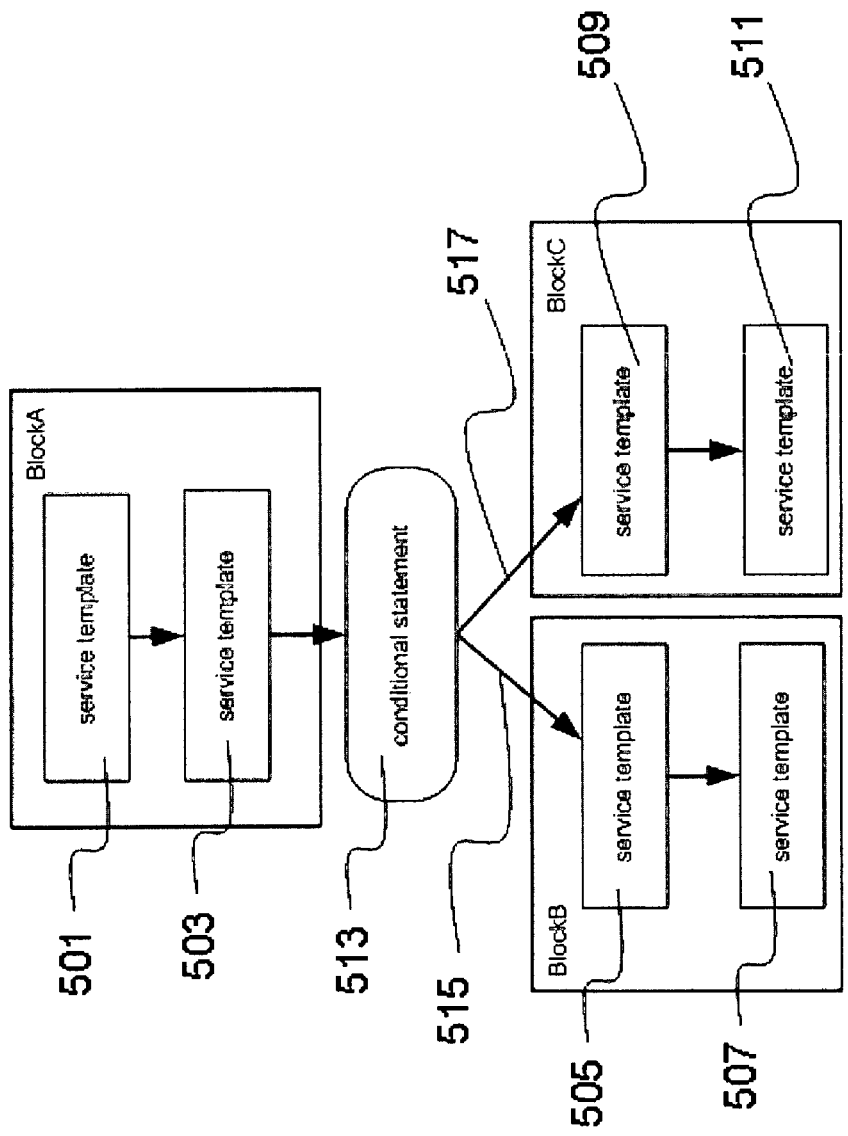
FIG. 5 shows an application skeleton with a conditional element according to an embodiment.

FIG. 5 depicts, by way of example, an application skeleton comprising service templates 501 and 503 arranged within a block A, service templates 505 and 507 arranged within a block B and service templates 509 and 511 arranged within a block C. Furthermore, a conditional statement 513 with two branches 515 and 517 is provided, the branches 515, 517 respectively guiding towards block B or block C. While, by way of example, the service templates 501 and 503 in block A may always be executed, the execution of templates 505, 507 in block B and templates 509 and 511 in block C may depend on the results of the evaluation of the conditional statement 513. Thus, depending on the result of the conditional statement 513, either service templates 505, 507 of block B or service templates 509, 511 of block C will be executed.

Typically, the result of a conditional statement depends on the run-time state or on the results of the services executed before. Thus, conditional statements cannot be pre-evaluated and in general all branches with their services are equiprobable. Therefore, all services in all branches may be considered during the selection of the composition engine node. In order to express probability of services, their network related costs can be weighted accordingly. As shown in FIG. 5, the costs for services of the block A could be weighted with 1 and costs for services of block B and block C may be weighted with ½.

Instead of or in addition to the pre-evaluation of application skeletons, case-based composite service estimation may be applied. The case-based approach is based on the assumption that the composition decisions relating to e.g. a selection of services and branches are valid as long as all relevant information is the same. This means that under the same conditions the evaluation of the application skeleton results in the same composite service. Consequently, instead of or in addition to the pre-evaluation of the application skeletons, the information, e.g. a list of services, from previous executions can be reused. The total network related costs of the composite service can be recalculated based on this service list or the costs can be reused as well. The case-based approach makes the time required for the selection of the composition engine independent of application skeleton's size. If the information from previous executions is not enough to select the best suitable composition engine, e.g. if a resulted service list was different from execution to execution, a pre-evaluation of application skeletons or a part of it can be applied.

Figure 6:
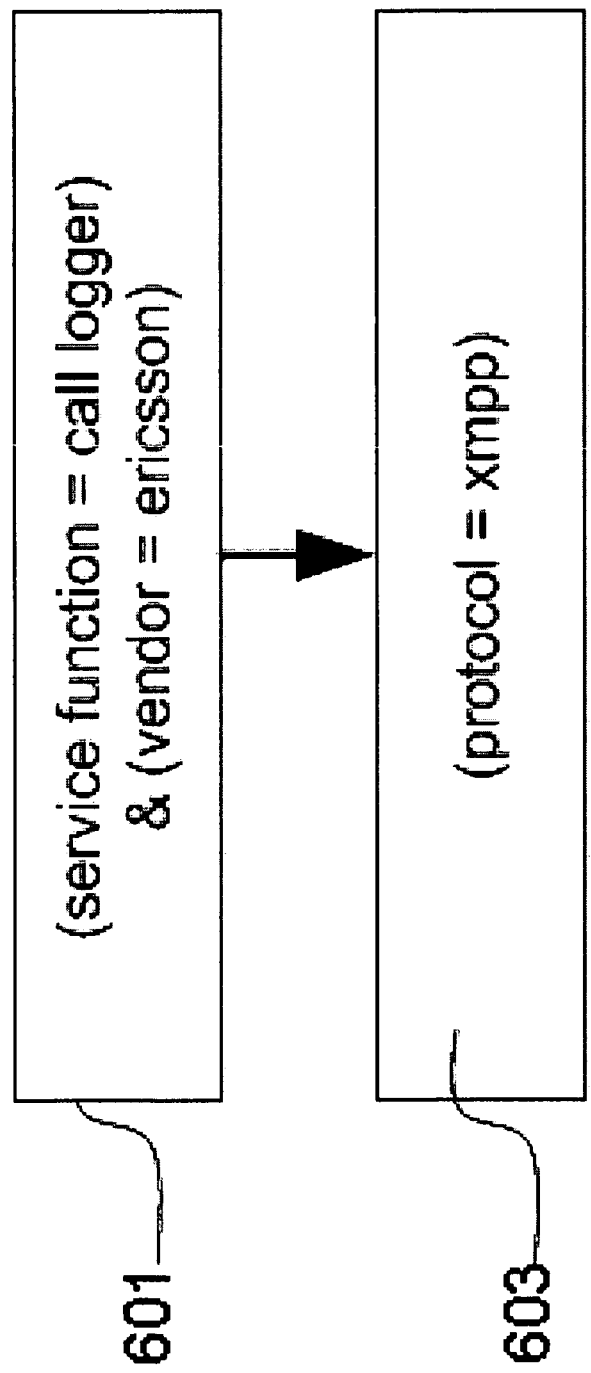
FIG. 6 shows a template describing a service composition according to an embodiment.

FIG. 6 shows an embodiment of an application skeleton having templates 601 and 603, wherein the service selection may be performed independently from the run-time state. By way of example, the template of FIG. 6 may describe a service composition containing two services: Service 601 may be a service that provides a call logger function and has Ericsson as vendor, and service 603 may be a service with the support for XMPP protocol.

Figure 7:
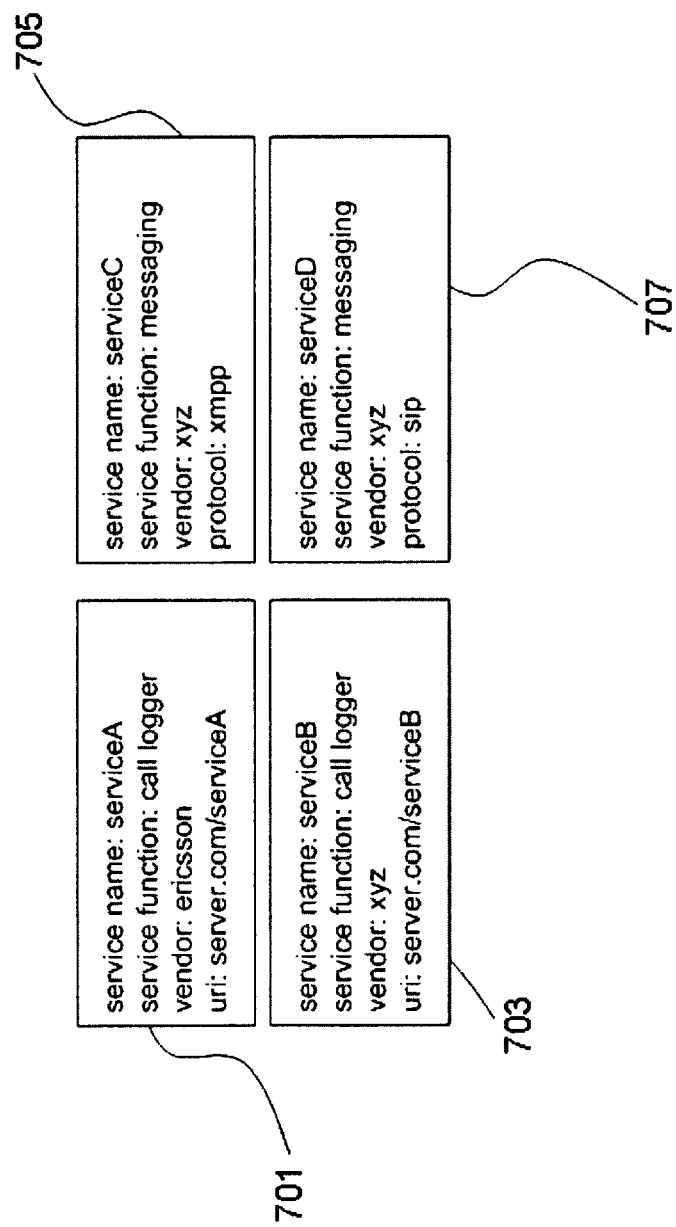
FIG. 7 shows service descriptions according to an embodiment.

Which particular service will be included in the composite service may be decided by the composition engine at run-time based on the composite service templates and on service descriptions. By way of example, the service database may contain 4 service descriptions 701, 703, 705 and 707 as depicted in FIG. 7. Hence, the composition engine may create a composite service containing the service A and the service C.

Figure 8:
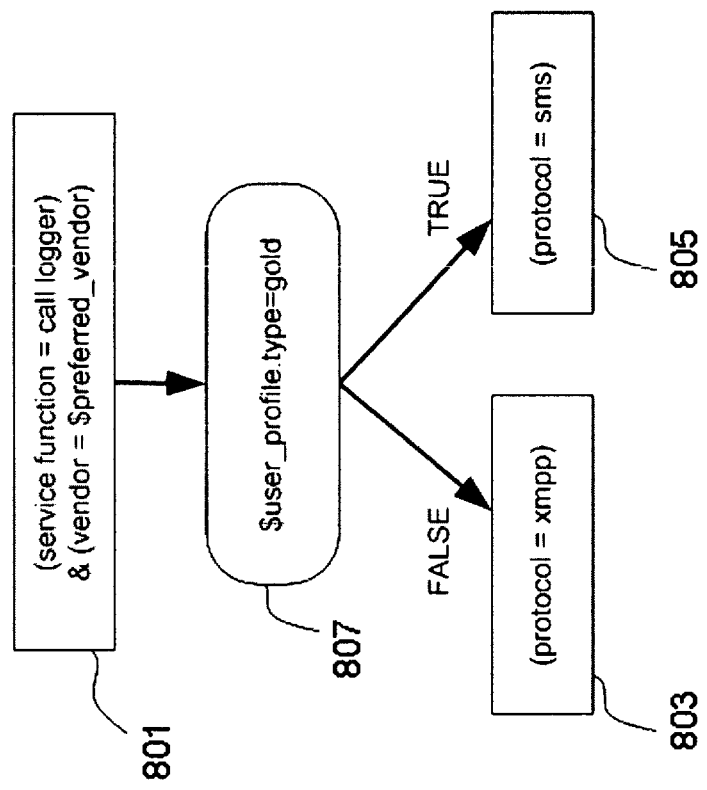
FIG. 8 shows an application skeleton according to an embodiment.

FIG. 8 demonstrates a service selection which depends on a run-time state. The application skeleton comprises 3 service templates 801. 803, 805, and a conditional statement 807, where, depending on a result of the conditional statement, the service template 803 with constraints (protocol=xmpp) or the service template 805 with constraints (protocol=sms) will be evaluated.

According to some implementations, an executing composition engine may be changed during composite service execution. For composite services comprising a big number of constituent services and/or highly distributed and fragmented services it could be beneficial to change the executing composition engine during the application skeleton execution process. For instance, one part of application skeleton may be executed on one composition engine and than the second part on another composition engine. This would allow reducing additional network costs in the aforementioned example by the execution the service s4 on the composition engine 1 and the service s2 on the composition engine 2 as shown in FIG. 3

Different methods can be applied to detect, in particular automatically, whether and when the executing composition engine may be changed. Examples are:

- Recalculating the costs for the remaining part of the application skeleton permanently and change the executing composition engine if it would improve total costs; and/or
- Recalculating the costs for the remaining part of the application skeleton at all conditional elements after they were evaluated and the branch was selected, which may have an impact on the probability of the services; and/or
- Recalculating the costs for the remaining part of the application skeleton if there are changes in the costs. E.g. subscribe-notify approach can be used to get notifications from network costs provider node; and/or
- Recalculating the costs for the remaining part of the application skeleton if some of the services become available or unavailable; and/or
- Recalculating the costs for the remaining part of the application skeleton if some of composition engines become available or unavailable.

In order to change the executing composition engine during the composite service execution, the session information related to this composite service may be transferred to new composition engine. This process can cause some additional network costs that have to be considered by the selection of composition engine. Further, the interface of the composition engine may be extended with the functions to support transfer of execution processes.

According to some implementations, the approach described herein may lead to an optimization of end-to-end composite services costs by reduction of the network costs for invocation of constituent services. This may improve the user experience as shorter delays may be expected until the required service is set up. Also a given application server node that works with the service composition technology and that is enhanced according to the principles described herein may become a higher capacity with respect to users that can be served due to the decreased effort needed to set up a single composite service.

Further, because of its general nature the service composition technology it can be used outside of IMS context. Thus, a composition engine according to the above definitions as well as BPEL and BPML engines can play the role of a service engine in Enterprise Service Bus (ESB) and used to create composite service in an enterprise context. Distributed deployment of service engines can be applied in such contexts as well. Thus, above embodiments do not only refer to composition engines but may also refer to a broader field of distributed service compositions running in clustered, cloud or ESB environments.

An embodiment refers to a system for managing an execution of a composite service, the composite service comprising constituent services, said system being adapted to perform the method as described.

The particular combinations of elements and features in the above detailed embodiments are exemplary only; the interchanging and substitution of these embodiments with other embodiments disclosed herein are also expressly contemplated. As those skilled in the art will recognize, variations, modifications, and other implementations of what is described herein can occur to those of ordinary skill in the art without departing from the spirit and the scope of the invention as claimed. Accordingly, the foregoing description is by way of example only and is not intended as limiting. The invention's scope is defined in the following claims and the equivalents thereto. Furthermore, reference signs used in the description and claims do not limit the scope of the invention as claimed.

The invention claimed is:

1. A method for managing an execution of a composite service comprising constituent services, the method comprising:
   providing first service complexity measures indicating a complexity related to executing a number of constituent services of the composite service by a first service execution node;
   providing second service complexity measures indicating a complexity related to executing the number of constituent services of the composite service by a second service execution node;
   determining a first total complexity measure based on the first service complexity measures;
   determining a second total complexity measure based on the second service complexity measures; and
   selecting the first service execution node or the second service execution node for executing the number of constituent services of the composite service dependent on at least one of the first total complexity measure and the second total complexity measure;
   wherein the service complexity measures are determined based on:
   static information comprising at least one of a composite service template, a service description, and a service location; and
   dynamic information comprising a result of at least one previous execution of the composite session;
   wherein selecting the first service execution node or the second service execution node further comprises:
   selecting the first service execution node during run-time if the first total complexity measure does not exceed the second total complexity measure; and
   selecting the second service execution node during run-time if the second total complexity measure does not exceed the first total complexity measure.

2. The method of claim 1, further comprising initiating the execution of the number of constituent services of the composition service by the selected service execution node.

3. The method of claim 1, further comprising transmitting session information relating to the execution of the composition service to the selected service execution node for executing the composite service.

4. The method of claim 1, further comprising:
   determining an initial complexity measure accumulated during a previous execution of the composite service; and
   selecting the first or the second service execution node in further dependency on the initial complexity measure.

5. The method of claim 1, wherein the composite service comprises a further number of constituent services, the method further comprising:
   providing third service complexity measures indicating a complexity related to executing the further number of constituent services by the first service execution node;
   providing fourth service complexity measures indicating a complexity related to executing the further number of constituent services of the composite service by the second service execution node;
   determining a third total complexity measure based on the third service complexity measures;
   determining a fourth total complexity measure based on the fourth service complexity measures; and selecting the first service execution node or the second service execution node for executing the further number of constituent services of the composite service dependent on at least one of the first total complexity measure, the second total complexity measure, the third total complexity measure, and the fourth total complexity measure.

6. The method of claim 1, wherein the composite service comprises a further number of constituent services, the method comprising:
providing third service complexity measures indicating a complexity related to executing the further number of constituent services by the first service execution node;
providing fourth service complexity measures indicating a complexity related to executing the further number of constituent services of the composite service by the second service execution node,
determining a third total complexity measure based on the third service complexity measures;
determining a fourth total complexity measure based on the fourth service complexity measures;
determining a minimum composite complexity measure based on the total complexity measures; and
selecting the first service execution node or the second service execution node to execute the respective number of constituent services at the minimum composite complexity measure.

7. The method of claim 1, further comprising evaluating a composite service information to determine the number of constituent services which are to be executed when executing the composite service, the composite service information indicating at least one of a structure of the composite service, the constituent services, and session information relating to the execution of the composition service.

8. The method of claim 1, further comprising evaluating a composite service information to determine the first or the second service complexity measures dependent on a conditional execution of at least one constituent service when executing the composite service.

9. The method of claim 1, further comprising determining the service complexity measures based on pre-stored service complexity measures related to previous executions of the constituent services or of the composite service.

10. The method of claim 1, further comprising determining the service complexity measures based on dynamic information, the dynamic information comprising at least one of composite session data, statistical records about service execution, a network load, and a latency between network or session nodes of at least one previous execution of the composite session.

11. The method of claim 1, wherein the first total complexity measure or the second total complexity measure is obtained by:
summing up the respective service complexity measures; or
evaluating a complexity function comprising one of a linear complexity function and a non-linear complexity function using the service complexity measures as function variables.

12. The method of claim 1, wherein the composite service comprises at least one of:
an Internet Protocol Multimedia Subsystem (IMS) composite service;
an instance of a Business Process Execution Language (BPEL) process;
an instance of a Business Process Modeling Language (BPML) process; and
an instance of an Enterprise Service Bus (ESB) composite service.

13. The method of claim 12, wherein the first execution node or the second service execution node comprises:
a composition execution agent configured to operate according to the IMS technology; or
a composite service engine configured to operate according to the IMS technology; or
a computing node in a distributed computing network comprising a cloud computing network or an ESB environment.

14. The method of claim 1, wherein the service complexity measures comprise at least one of:
latencies related to executing the respective constituent service by the respective service execution node;
time delays related to a data transfer over a communication network between a service location and the respective service execution node; and
network resources allocated to the respective service execution node for executing a respective constituent service.

15. A service execution management entity for managing an execution of a composite service, the composite service comprising constituent services, the service execution management entity comprising:
a complexity provider configured to provide:
first service complexity measures indicating a complexity related to executing a number of constituent services of the composite service by a first service execution node; and
second service complexity measures indicating a complexity related to executing the number of constituent services of the composite service by a second service execution node;
a complexity determiner configured to determine a first total complexity measure based on the first service complexity measures and a second total complexity measure based on the second service complexity measures; and
a service execution node selector configured to select the first service execution node or the second service execution node for executing the number of constituent services of the composite service dependent on at least one of the first total complexity measure and the second total complexity measure;
wherein the service complexity measures are determined based on:
static information comprising at least one of a composite service template, a service description, and a service location; and
dynamic information comprising a result of at least one previous execution of the composite session;
wherein selecting the first service execution node or the second service execution node further comprises:
selecting the first service execution node during run-time if the first total complexity measure does not exceed the second total complexity measure; and
selecting the second service execution node during run-time if the second total complexity measure does not exceed the first total complexity measure.

16. The service execution management entity of claim 15, further comprising a transmitter configured to transmit session information relating to the execution of the composition service towards the selected service execution node for executing the composite service.

17. The service execution management entity of claim 16, wherein the transmitter is further configured to transmit an execution request towards the selected service execution node to initiate the execution of the number of constituent services of the composition service by the selected service execution node.

18. A computer program product stored in a non-transitory computer readable medium for managing an execution of a composite service comprising constituent services, the computer program product comprising software instructions which, when run on a computer, causes the computer to:
provide first service complexity measures indicating a complexity related to executing a number of constituent services of the composite service by a first service execution node;
provide second service complexity measures indicating a complexity related to executing the number of constituent services of the composite service by a second service execution node;
determine a first total complexity measure based on the first service complexity measures;
determine a second total complexity measure based on the second service complexity measures; and
select the first service execution node or the second service execution node for executing the number of constituent services of the composite service dependent on at least one of the first total complexity measure and the second total complexity measure;
wherein the service complexity measures are determined based on:
static information comprising at least one of a composite service template, a service description, and a service location; and
dynamic information comprising a result of at least one previous execution of the composite session;
wherein selecting the first service execution node or the second service execution node further comprises:
selecting the first service execution node during run-time if the first total complexity measure does not exceed the second total complexity measure; and
selecting the second service execution node during run-time if the second total complexity measure does not exceed the first total complexity measure.

19. The computer program product of claim 18, wherein the computer is disposed in a programmable network entity.

20. A system for managing an execution of a composite service, the composite service comprising constituent services, the system configured to perform a method for managing an execution of a composite service comprising constituent services, the system comprising:
a processor configured to:
provide first service complexity measures indicating a complexity related to executing a number of constituent services of the composite service by a first service execution node;
provide second service complexity measures indicating a complexity related to executing the number of constituent services of the composite service by a second service execution node;
determine a first total complexity measure based on the first service complexity measures;
determine a second total complexity measure based on the second service complexity measures; and
select the first service execution node or the second service execution node for executing the number of constituent services of the composite service dependent on at least one of the first total complexity measure and the second total complexity measure;
wherein the service complexity measures are determined based on:
static information comprising at least one of a composite service template, a service description, and a service location; and
dynamic information comprising a result of at least one previous execution of the composite session;
wherein selecting the first service execution node or the second service execution node further comprises:
selecting the first service execution node during run-time if the first total complexity measure does not exceed the second total complexity measure; and
selecting the second service execution node during run-time if the second total complexity measure does not exceed the first total complexity measure.

* * * * *

UNITED STATES PATENT AND TRADEMARK OFFICE
CERTIFICATE OF CORRECTION

PATENT NO. : 9,124,593 B2  
APPLICATION NO. : 13/519925  
DATED : September 1, 2015  
INVENTOR(S) : Levenshteyn et al.

Page 1 of 1

It is certified that error appears in the above-identified patent and that said Letters Patent is hereby corrected as shown below:

On the Title Page, in the figure, for Tag "121", in Line 1, delete "complexty" and insert -- complexity --, therefor.

In the drawings:

In Fig. 1, Sheet 1 of 8, for Tag "121", in Line 1, delete "complexty" and insert -- complexity --, therefor.

In Fig. 5, Sheet 5 of 8, for Tag "513", in Line 1, delete "condltlonal" and insert -- conditional --, therefor.

In the specification:

In Column 2, Line 62, delete "then" and insert -- than --, therefor.

In Column 9, Line 1, delete "Constituent" and insert -- constituent --, therefor.

In Column 12, Line 20, delete "rater" and insert -- rather --, therefor.

In Column 14, Line 62, delete "than" and insert -- then --, therefor.

In Column 14, Line 67, delete "3" and insert -- 3. --, therefor.

Signed and Sealed this  
Twenty-eighth Day of June, 2016

Michelle K. Lee  
*Director of the United States Patent and Trademark Office*